Nov. 7, 1939. A. Y. DODGE ET AL 2,178,851
LUBRICATING DEVICE
Filed Sept. 19, 1936   5 Sheets-Sheet 2
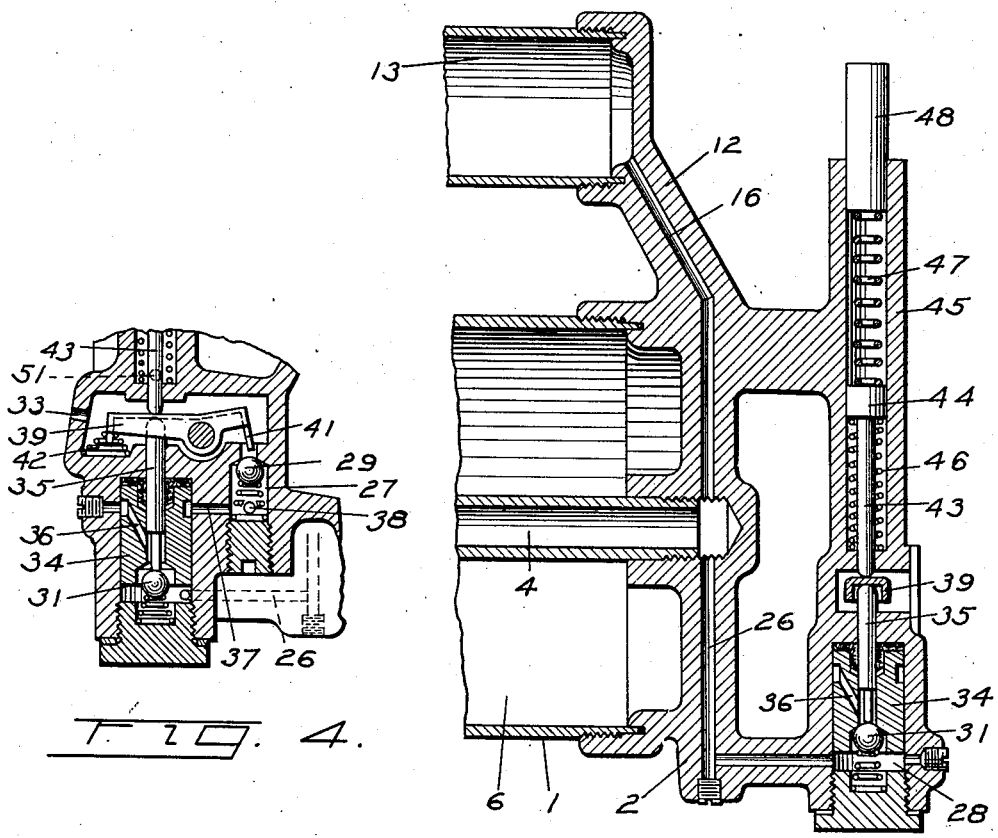
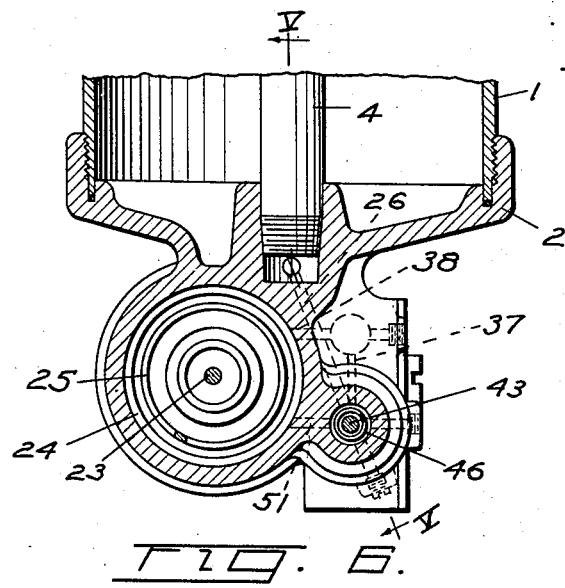
INVENTORS
ADIEL Y. DODGE
HARRY R. TEAR
BY McConkey + Booth
ATTORNEYS.

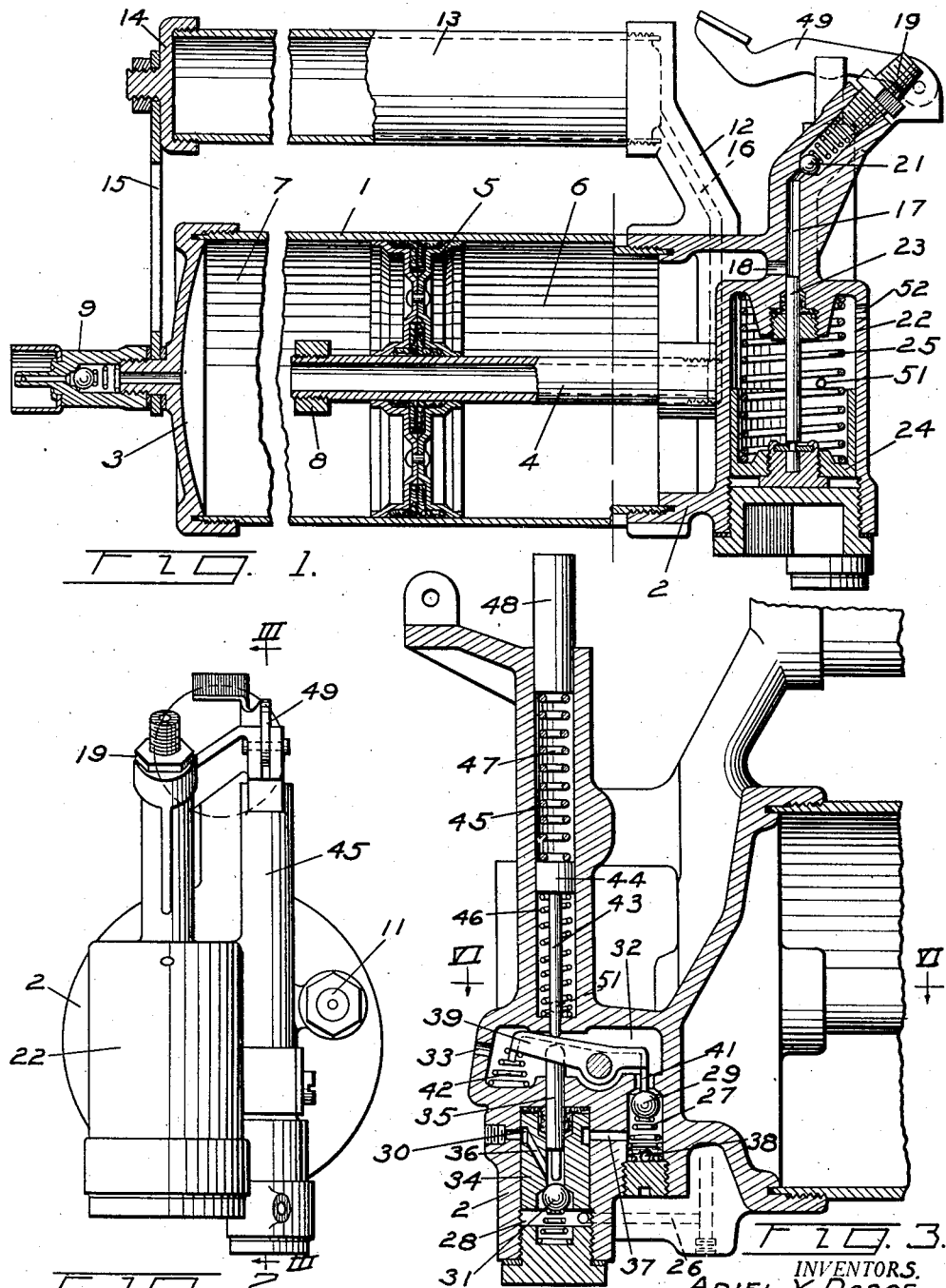

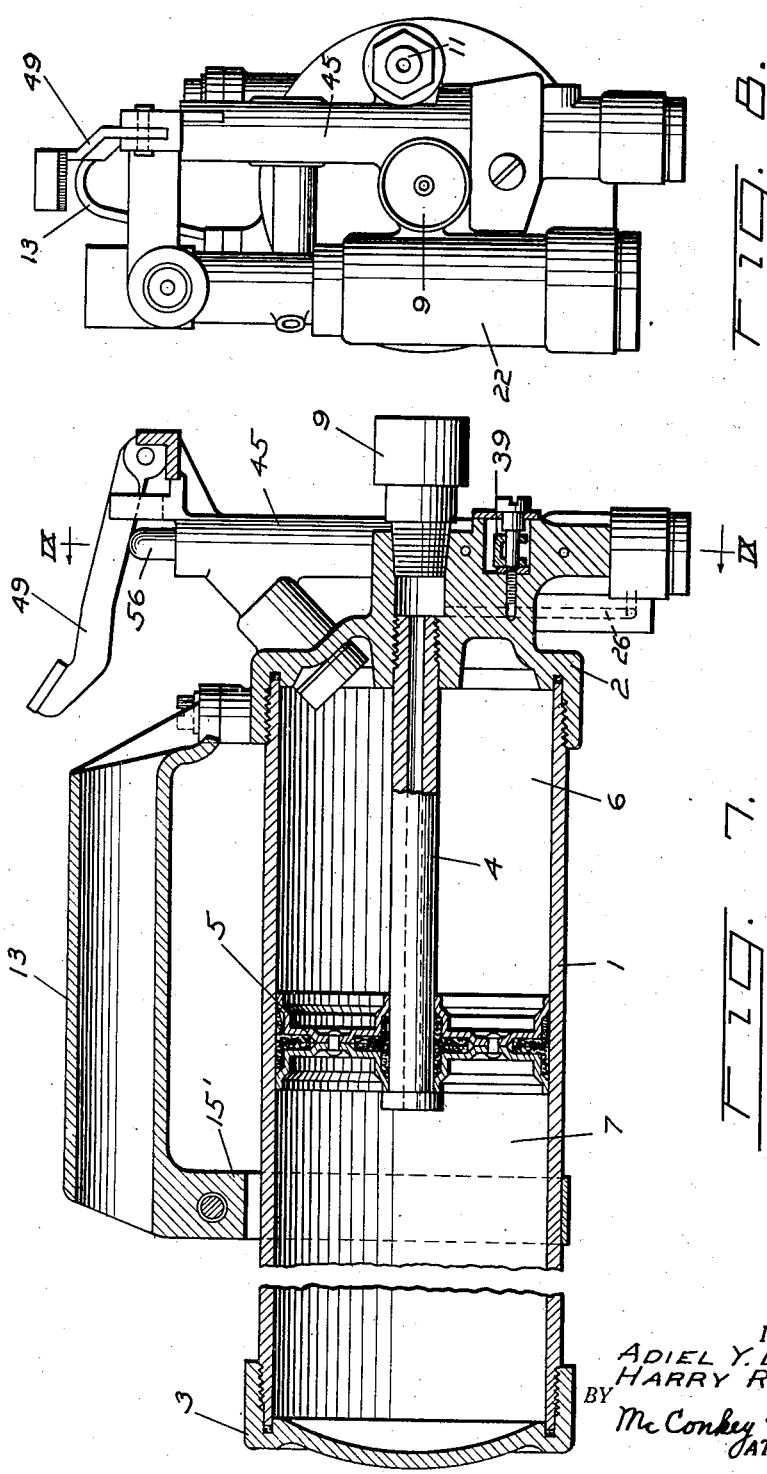

Nov. 7, 1939.　　A. Y. DODGE ET AL　　2,178,851
LUBRICATING DEVICE
Filed Sept. 19, 1936　　5 Sheets-Sheet 4
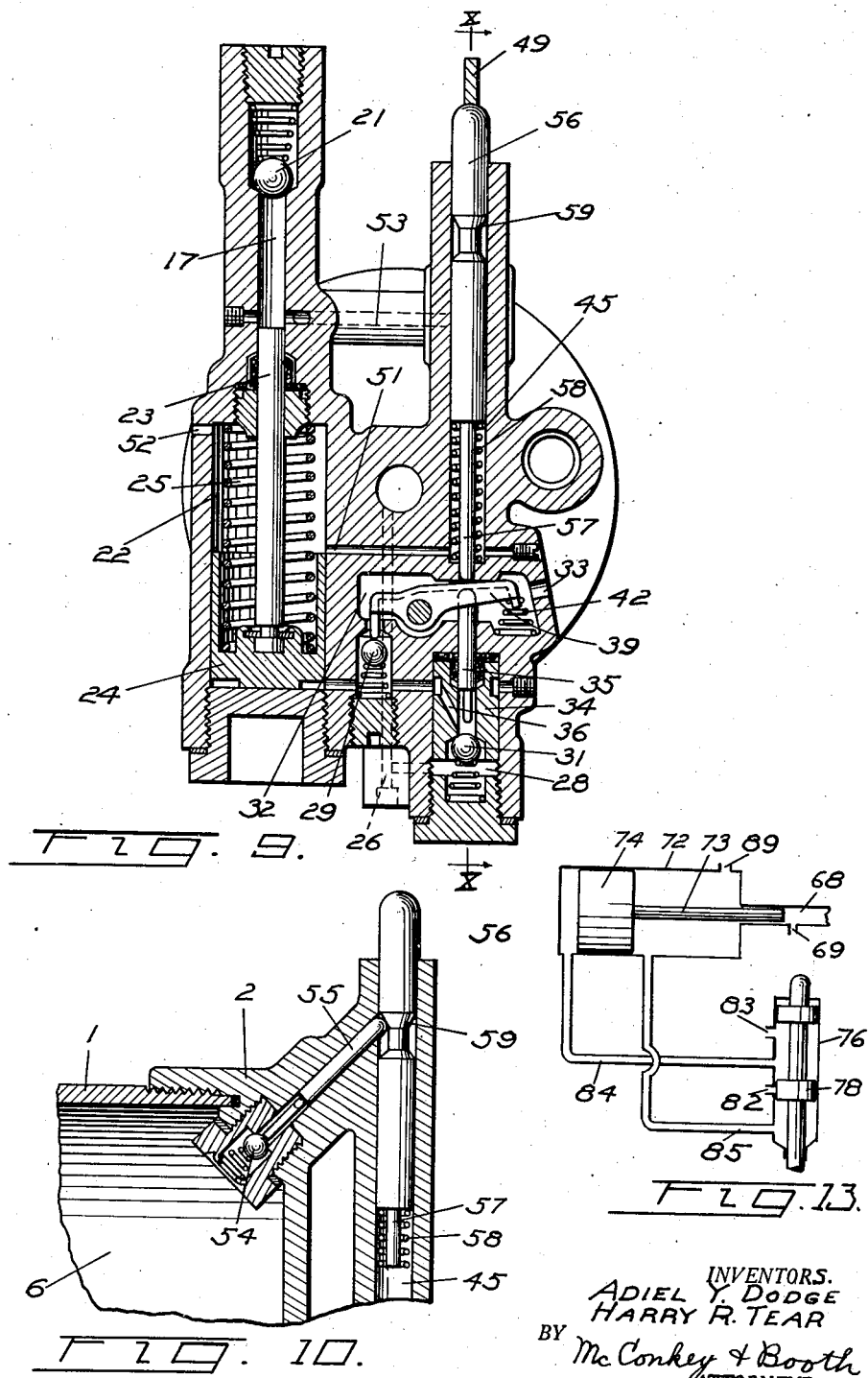
INVENTORS.
ADIEL Y. DODGE
HARRY R. TEAR
BY McConkey & Booth
ATTORNEYS.

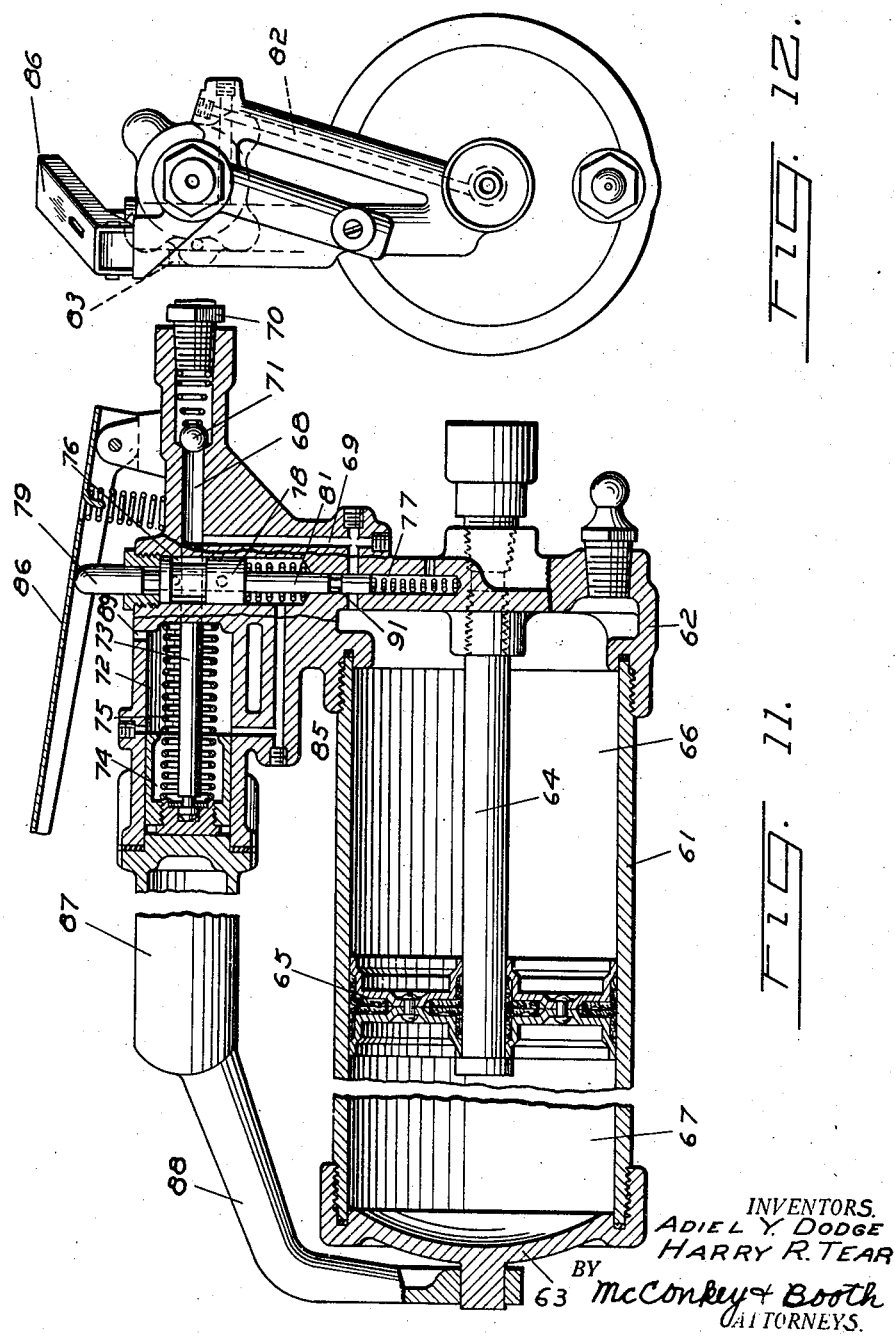

Patented Nov. 7, 1939

2,178,851

UNITED STATES PATENT OFFICE 2,178,851

LUBRICATING DEVICE

Adiel Y. Dodge, South Bend, Ind., and Harry R. Tear, Evanston, Ill., assignors to The Lubrication Corporation, Chicago, Ill., a corporation of Delaware Application September 19, 1936, Serial No. 101,572

9 Claims. (Cl. 221—47.3)

This invention relates to lubricating devices and more particularly to portable power-operated lubricant dispensers or guns.

Portable power-operated lubricant dispensers have been proposed using compressed air or electricity for power which is conducted to the dispenser through suitable flexible conduits or wires, the lubricant being conducted to the dispenser from a reservoir through a similar flexible tube or conduit. Such conduits or wires have interfered with the portability of these dispensers, serving to limit the distance through which they can be moved and otherwise impeding free handling thereof by an operator. Accordingly, it is one of the objects of the present invention to provide a self-contained portable lubricant dispenser in which no connection to an outside source of power or source of lubricant supply is necessary during use and which consequently is freely portable throughout any desired distance.

Another object of the invention is to provide a portable dispenser in which motive fluid may be stored.

Another object is to provide novel control means for controlling operation of the fluid motor which operates a lubricant pump.

Other objects, advantages and novel features of the invention will be apparent from the following description when read in connection with the accompanying drawings, in which:

Figure 1 is an axial section with parts in elevation of a lubricant dispenser embodying the invention;

Figure 2 is an end view looking from the right of Figure 1;

Figure 3 is a partial section on the line III—III of Figure 2;

Figure 4 is a partial section similar to Figure 3 showing another position.

Figure 5 is a section on the line V—V of Figure 6;

Figure 6 is a section on the line VI—VI of Figure 3;

Figure 7 is an axial section of a modified form of the invention;

Figure 8 is an end view looking from the right of Figure 7;

Figure 9 is a section on the line IX—IX of Figure 7;

Figure 10 is a partial section on the line X—X of Figure 9;

Figure 11 is a central section of a further modified form of the invention;

Figure 12 is an end view looking from the right of Figure 11; and

Figure 13 is a diagrammatic view illustrating the valve connections in Figures 11 and 12.

Figures 1 to 6 illustrate a portable lubricant dispenser including a cylindrical reservoir 1 closed at one end by a head 2 and at its opposite end by a cap 3. The head 2 supports a hollow tube 4 extending axially into the reservoir 1 and a piston 5 is slidably mounted on the tube 4 and engages the sides of the reservoir 1 to divide it into a lubricant chamber 6 and air chamber 7. A collar 8 is preferably screw-threaded on to the end of the tube 4 to limit the movement in one direction of the piston 5. The head 3 carries a valved air inlet 9 for supplying air to the air chamber 7 and a lubricant nipple 11 is secured to the head 2 through which lubricant may be supplied to the chamber 6.

The head 2 carries a bracket 12 which serves as the support for one end of a hollow tubular handle 13 which is closed at its opposite end by a cap 14. The cap 14 is connected by means of a strap or the like 15 to the head 3 for supporting the opposite end of the handle. Preferably the bracket 12 is provided with a bore or passage 16 communicating with the tube 4 in order that the handle may serve as additional storage space for compressed air or other operating fluid.

The head 2 is formed with a lubricant pump cylinder 17 having an inlet port 18 communicating with the lubricant chamber 6 and an outlet 19 controlled by a spring pressed check valve 21. A fluid motor cylinder 22 is formed in the head 2 co-axially with the cylinder 17 and interconnected pistons 23 and 24 are slidable in said cylinders respectively. A compression spring 25 is preferably mounted in the cylinder 22 for urging the pistons to their lowermost position as shown in Figure 1.

Air is supplied to the cylinder 22 from the storage chamber 7 and handle 13 through a passage 26 communicating with the tube 4 and the bore 16. For controlling the supply of air to the motor the head 2 is formed with an exhaust valve chamber 27 and an inlet valve chamber 28 containing spring pressed exhaust and inlet check valves 29 and 31 respectively. The exhaust valve 29 seats adjacent the end of the chamber 27 and controls communication between this chamber and a chamber 32 having an atmospheric vent 33. The inlet valve 31 seats on the lower end of a valve body 34 which has a coaxial bore in which a pin 35 is slidably mounted and a sloping bore 36 which communicates with the valve chamber 27 through a circumferential groove 30 and a cross-bore 37. It will be noted that the upper end of the rod 35 extends into the chamber 32. The valve chamber 27 is connected to the lower end of the cylinder 22 below the piston 24 by means of a bore 38.

The valves 29 and 31 are controlled by a lever 39 pivoted intermediate its ends in the chamber 32 and having a projecting finger 41 on one end adapted to engage and unseat the valve 29. The lever 39 engages the pin 35 at the opposite side of its pivot and is provided with a compression spring 42 adapted to move it into a position to open the valve 29 as shown in Figure 3.

The position of the lever 39 is controlled by means of a rod 43 extending into the chamber 32 and secured to a piston 44 which is slidably mounted in a cylinder 45 formed in the head 2. A compression spring 46 is mounted in the cylinder 45 and urges the piston 44 and rod 43 upwardly therein as shown in Figure 3. A second compression spring 47 which is heavier than the spring 46 is mounted in the cylinder 45 above the piston 44 and is confined at its upper end by a plunger 48 slidably mounted in the cylinder 45. The plunger 48 may be controlled by a lever 49 pivoted on the head 2 and having a thumb piece lying adjacent the end of the handle 13. The cylinder 45 is connected by means of a transverse bore 51 to the central portion of the cylinder 22.

Assuming that the lubricant chamber 6 contains a charge of lubricant and that the air chamber 7 and handle 13 are filled with a charge of compressed air, the device may be operated by depressing the lever 49 to lower the piston 44 and pin 43 through the action of the spring 47. As the pin 43 moves downwardly it engages the lever 39 and rocks it about its pivot into the position shown in Figure 4 in which the finger 41 is moved out of contact with the exhaust valve 29 to permit it to close under the influence of its spring and the rod 35 is moved downwardly to open the inlet valve 31. At this time air may flow through the passage 26 past the valve 31 and through the passages 36, 30, 37, and 38 into the cylinder 22. The pistons 23 and 24 will be raised due to the action of the air on the lower end of the piston 24, the piston 23 forcing lubricant out of the cylinder 17 past the check valve 21 and through the discharge outlet 19. As the piston 24 travels upwardly in the cylinder 22 its lower edge will uncover the bore 51 permitting air under pressure to flow into the lower end of the cylinder 45 below the piston 44. The force exerted by this air on the piston 44, together with the force of the spring 46, will raise the piston 44 against the spring 47 permitting the lever 39 to rock back into the position of Figure 3 under the influence of the spring 42. At this time the inlet valve 31 will be closed and the exhaust valve 29 will be open so that air in the cylinder 22 can flow back through passage 38 past valve 29 into chamber 32 and out the vent 33 to atmosphere.

The spring 25 will then lower the pistons 24 and 23 to the position of Figure 1 at which time the bore 51 will be uncovered above the piston 24 and air in the cylinder 45 can exhaust through the bore 51 and out a suitable vent 52 to atmosphere. Since the force below the piston 44 is thus reduced, the spring 47 will again overpower the spring 46 and move the parts into the position of Figure 4 and the cycle will be repeated.

If it is desired to operate the dispenser to dispense only a single charge of lubricant, the lever 49 may be depressed further, placing sufficient force on the spring 47 and piston 44 so that air pressure acting below the piston 44 as described above will be insufficient to overpower the spring 47. In this case the automatic operation described above may be defeated and after dispensing a single charge of lubricant the pump will stop until such time as the pressure on lever 49 is relieved.

Figures 7 to 10 illustrate a modified form of the invention which is similar in many respects to the form of Figures 1 to 6 and for the sake of brevity of description parts in Figures 7 to 10 corresponding to like parts in Figures 1 to 6 will be designated by the same reference characters. In the modification of Figures 7 to 10 the air inlet valve 9 is secured to the head 2 rather than to the cap 3 and communicates directly with the tube 4. Also in this form the handle 13 is not utilized as an additional air storage space, but is merely bolted to the head 2 and is provided with a strap 15' encircling the reservoir 1.

The lubricant chamber 6 of Figures 7 to 10 communicates with the cylinder 17 through a passage 53 controlled by a spring-pressed check valve 54. The check valve 54 is adapted to be opened by a pin 55 slidably mounted in the head 2. Both the valve 54 and the lever 39 are controlled by a solid plunger 56 slidably mounted in the cylinder 45. The plunger 56 has a reduced extension 57 extending into the chamber 32 and engaging the lever 39 to rock it about its pivot, a spring 58 being provided to urge the plunger 56 upwardly. The plunger 56 is provided with a cam portion 59 adapted to engage and move the pin 55. It will be noted that in the modification of Figures 7 to 10 an appreciable amount of lost motion is provided between the rod 35 and the inlet check valve 31.

In operation of this modification the lever 49 is first moved downwardly a sufficient amount to take up the lost motion between the rod 35 and valve 31. During this movement the cam portion 59 moves the rod 55 inwardly to open the valve 54 and lubricant will be forced from the chamber 6 past the valve 54 and through the passage 53 into the cylinder 17 by the action of the compressed air in the chamber 7 on the piston 5. If this pressure is sufficient to force lubricant past the outlet check valve 21 and to the point to be lubricated, no further operation is necessary. However, if a higher pressure is necessary or desirable, the lever 49 may be depressed further to open the valve 31 and permit the valve 29 to close. At this time air will be admitted to the lower portion of the cylinder 22 to operate the pistons 23 and 24 and dispense lubricant from the cylinder 17 under high pressure.

After the piston 24 has moved upwardly sufficiently for its lower edge to clear the passage 51, air under pressure will flow through the passage 51 into the cylinder 45 below the plunger 56. This creates an upward force on the plunger 56 reacting on the lever 49 and if this force is sufficient to overcome the applied force on the lever 49 the plunger 56 will move upwardly into the position of Figure 9 at which time the inlet valve 31 will be closed and the exhaust valve 29 will be open. Thus the air below the piston 24 will be exhausted through the chamber 32 and the atmospheric vent 33 and the pistons 23 and 24 will return to their lower position shown in Figure 9. In this position the cylinder 45 is vented to atmosphere through the passage 51 and the vent 52 and if the force is still applied to lever 49, it will again lower the plunger 56 to open the inlet valve 31 and close the exhaust valve 29. In this way a semi-automatic operation is produced depending upon the continuation of a force on the lever 49 which is enough to open the valve 31 but not enough to oppose upward movement of the plunger 56 under the influence of air pressure acting thereon. It will be apparent that a single shot operation may be produced by applying a greater force on the lever 49 which is sufficient to hold the plunger 56 down against the air pressure action on the lower end thereof.

Figures 11 to 13 illustrate a further modified arrangement in which a different type valve is employed and in which the parts are arranged differently. In this modification a cylindrical lubricant reservoir 61 is closed at one end by a head 62 and at its opposite end by a cap 63. The head 62 supports a tube 64 extending axially into the reservoir and a piston 65 is slidably mounted on the tube 64 and divides the reservoir 61 into a lubricant chamber 66 and an air chamber 67.

The head 62 is formed with a lubricant cylinder 68 above and parallel with the reservoir 61 and a passage 69 connects the grease chamber 66 to the inner end of the cylinder 68. The outer end of the cylinder 68 is provided with a lubricant outlet 70 controlled by a spring pressed check value 71. Coaxial with the cylinder 78 the head 62 is formed with a motor cylinder 72 and a pair of interconnected pistons 73 and 74 are slidably mounted in said cylinders respectively, a suitable spring 75 being arranged in the cylinder 72 to urge the pistons inwardly or to the left as seen in Figure 11.

An air valve cylinder 76 is formed in the head 62 and a grease valve cylinder 77 is formed coaxially therewith. A spool type valve 78 is slidably mounted in the cylinder 76 and has an extension 79 projecting outwardly therefrom and an extension 81 projecting into the cylinder 77. The extension 81 is formed with an annular groove or reduced portion 91 for a purpose to appear later. The valve cylinder 76 is connected intermediate its ends to the tube 64 and air chamber 67 by means of a passage 82 and has an exhaust opening 83 in its upper portion. Between the exhaust opening 83 and the passage 82 the valve cylinder 76 is connected to the end of the cylinder 72 back of the piston 74 by means of a passage 84 (Figure 13) and a further passage 85 connects the central portion of the cylinder 72 to the lower portion of the valve cylinder 76. A lever 86 is pivoted on the head 62 and engages the extension 79 of the valve to control the position thereof.

The outer end of the cylinder 72 is closed by means of the end of a handle 87 which is bolted to the cylinder 72 and has an extension 88 secured to the cap 63 to support the handle. The free end of the lever 86 lies adjacent the handle 87 in a position where it may conveniently be engaged by the operator's thumb.

Assuming that the lubricant chamber 66 is charged with lubricant and the air chamber 67 is filled with compressed air, the device may be operated by pressing downwardly on the lever 86 to lower the valve 78. As best seen in Figure 13 the exhaust opening 83 will then be covered and the air passage 82 and the passage 84 will be in communication around the reduced portion of the valve. Consequently, air will flow from the passage 82 into the end of the cylinder 72 to urge the piston 74 forwardly therein. This operation will force the piston 73 through the cylinder 68 to dispense lubricant therefrom through the outlet 70 under high pressure. As the piston 74 travels forwardly in the cylinder 72, its rear edge will uncover the passage 85 permitting air to flow therethrough into the lower end of the valve cylinder 76. This air will urge the valve 78 upwardly against the pressure of the lever 86 thereon and if the force of the air is sufficient to overcome the applied force on the lever 86, the valve will move upwardly into the position of Figure 11 in which the exhaust port 83 and the passage 84 are in communication around the reduced portion of the valve. Thus, air will be exhausted from the cylinder 72 and the pistons 73 and 74 will be retracted under the influence of the spring 75. When the pistons reach the position shown in Figure 11 air in the valve chamber 74 will be vented through the passage 85 and an atmospheric vent 89 formed in the cylinder 72. If force is still applied to the lever 86, the valve will again be moved downwardly and the operation will be repeated.

It will be obvious that if a force is applied to the lever 86 in excess of the reaction thereon created by air acting on the valve 78, the valve will not return to its exhaust position and only a single charge of lubricant will be dispensed.

It will be noted that when the valve is in its exhaust position, the extension 81 closes the passage 69 to prevent the flow of lubricant from the lubricant chamber 66 to the cylinder 68. The extension 81 is provided with a reduced portion 91 which will register with the passage 69 when the valve is moved to its inlet position to permit lubricant to flow through the passage 69 around the reduced portion 91 into the cylinder 68. This arrangement effectively prevents any leakage of lubricant under the influence of air pressure in the chamber 67 acting on the piston 65 and insures that no lubricant will be discharged except when the lever 86 is moved.

While several embodiments of the invention have been illustrated and described in detail, it will be apparent that many changes may be made therein. Consequently it is not intended that the invention shall be limited to the embodiments shown or otherwise than by the terms of the appended claims.

We claim:

1. A lubricating device comprising, a reservoir, a tube extending axially into said reservoir, a piston slidable on said tube and dividing the reservoir into a lubricant chamber and an air chamber for storing air under pressure, said tube communicating with the air chamber, a pump connected to the lubricant chamber to receive lubricant therefrom, operating means for the pump connected to said tube to be actuated by said stored air and a manually operable valve controlling said connection to control the operating means.

2. A lubricating device comprising, a reservoir, a tube extending axially into said reservoir, a piston slidable on said tube and dividing the reservoir into a lubricant chamber and an air chamber for storing air under pressure, said tube communicating with the air chamber, a hollow handle connected to said reservoir and communicating with said tube to provide additional air storage space, a pump connected to the lubricant chamber to receive lubricant therefrom, and operating means for the pump communicating with the air chamber, the tube and the handle to be actuated by the air stored therein.

3. A lubricating device comprising, a lubricant pump, power means for operating said pump, a tube secured to said power means and extending outwardly therefrom, said tube communicating with the power means, a piston slidably mounted on the tube, and a reservoir surrounding the tube and piston and divided by the piston into a lubricant chamber communicating with the pump and an air storage chamber communicating with the tube, and a valved air fitting communicating with the air chamber for detachable connection to a source of air under pressure to fill the air chamber and a valve for controlling the supply of air from the air storage chamber to the power means.

4. A lubricating device comprising, a body forming a pair of coaxial cylinders, a pair of connected pistons operating in said cylinders, one of said cylinders and pistons forming a lubricant pump and the other forming a fluid motor for operating said pump, a tube connected to said body and lying substantially parallel to the cylinder axes and communicating with said fluid motor, a piston slidably mounted on said tube, a cylindrical reservoir surrounding the tube and piston and divided by the piston into a lubricant chamber communicating with the pump and an air storage chamber communicating with the motor, and means for controlling operation of the motor including an operating member lying adjacent said body.

5. A lubricating device comprising, a pump, a fluid motor for operating the pump, a portable body secured to the pump and formed with a lubricant reservoir communicating with the pump and an air storage chamber to receive and store a charge of compressed air for operating said motor whereby the device forms a portable, self-contained unit, a valved fitting communicating with the air storage chamber through which compressed air may be supplied to the chamber, and a valve for controlling the supply of air from the air storage chamber to the motor.

6. In a lubricating device including a pump and a fluid motor for operating said pump, control means for the motor comprising, a check valve controlling the supply of air to the motor, a check valve controlling exhaust of air from the motor, a pivoted lever having means engageable with said valves to open one valve when the lever is rocked in one direction and the other valve when the lever is rocked in the other direction, a plunger engageable with said lever to urge it in a direction to open the supply valve, and means for admitting fluid pressure to said plunger to urge it in the opposite direction.

7. In a lubricating device including a pump and a fluid motor for operating said pump, control means for the motor comprising, a check valve controlling the supply of air to the motor, a check valve controlling exhaust of air from the motor, a pivoted lever having means engageable with said valves to open one valve when the lever is rocked in one direction and the other valve when the lever is rocked in the other direction, a plunger engageable with said lever to urge it in a direction to open the supply valve, resilient means to urge the plunger in said direction to open the supply valve, and means for admitting fluid pressure to the plunger to urge it in the opposite direction.

8. In a lubricating device including a fluid motor, control means for the motor comprising, valve means controlling the supply and exhaust of fluid to the motor, resilient operating means to urge the valve means to its supply position, and means responsive to the pressure of fluid in the motor to urge the valve means to its exhaust position in opposition to said resilient means.

9. A lubricating device comprising, a pump, a fluid motor for operating the pump, a lubricant reservoir, a valve controlling communication of the lubricant reservoir with the pump, an air storage chamber, a valve for controlling communication of the air storage chamber with the motor, a plunger to open both of said valves upon movement in one direction, and means to admit fluid pressure from the motor to said plunger to urge the plunger in the opposite direction.

ADIEL Y. DODGE.
HARRY R. TEAR.